United States Patent [19]

Ulveling

[11] 4,368,678
[45] Jan. 18, 1983

[54] INJECTION OF PULVERIZED MATERIAL INTO A PRESSURIZED FURNACE

[75] Inventor: Leon Ulveling, Howald, Luxembourg

[73] Assignee: Paul Wurth S.A., Luxembourg

[21] Appl. No.: 216,438

[22] Filed: Dec. 15, 1980

[30] Foreign Application Priority Data

Dec. 27, 1979 [LU] Luxembourg ............................ 82036

[51] Int. Cl.³ .............................................. F23D 1/00
[52] U.S. Cl. .................................... 110/347; 110/185; 110/189; 110/263; 236/15 BA; 266/47
[58] Field of Search ............... 266/44, 47, 197; 75/42; 110/185, 189, 263, 347, 103; 236/15 BA, 15 BD

[56] References Cited

U.S. PATENT DOCUMENTS

| | | | |
|---|---|---|---|
| 3,178,234 | 4/1965 | Schulte et al. | 266/47 |
| 3,240,532 | 3/1966 | Ahner, Jr. | 266/47 |
| 3,910,209 | 10/1975 | Albrecht et al. | 110/189 |
| 4,004,730 | 1/1977 | Walker | 110/189 X |
| 4,306,507 | 12/1981 | Metz | 264/47 X |

Primary Examiner—Edward G. Favors
Attorney, Agent, or Firm—David S. Fishman

[57] ABSTRACT

A fuel stream comprising a combustible pulverized material entrained in a carrier gas is formed and subsequently injected into a blast furnace with the hot blast air without any detrimental effect on the hot air blast and with minimum energy consumption. The volume flow rate and pressure of the carrier gas are controlled as functions of the furnace pressure and the pulverized material feed rate is simultaneously controlled as a function of the carrier gas pressure drop.

26 Claims, 13 Drawing Figures

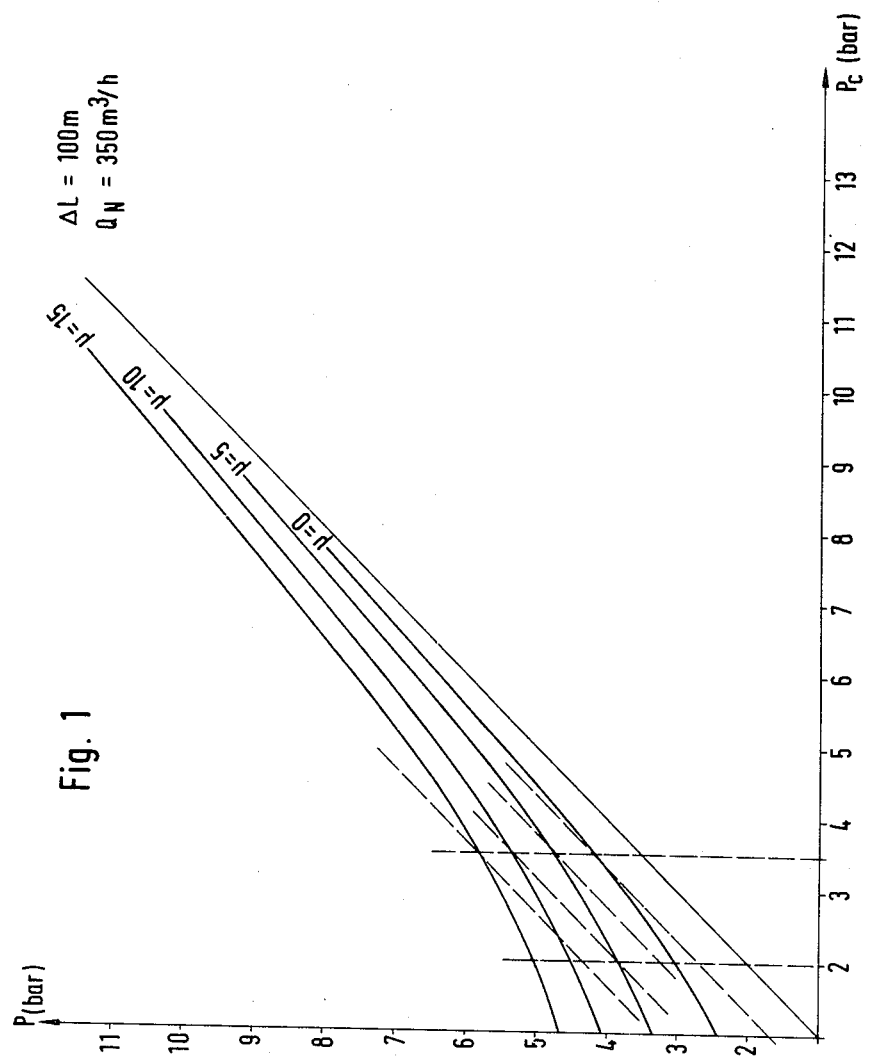

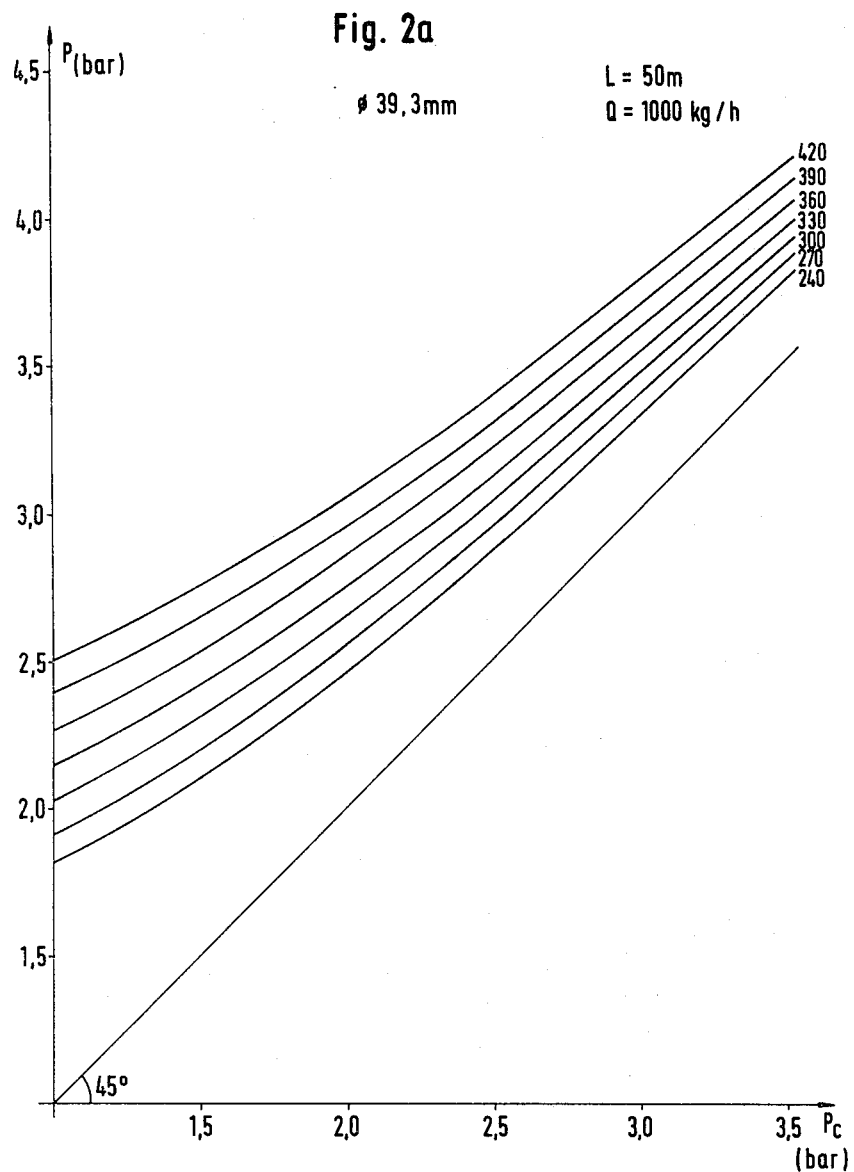

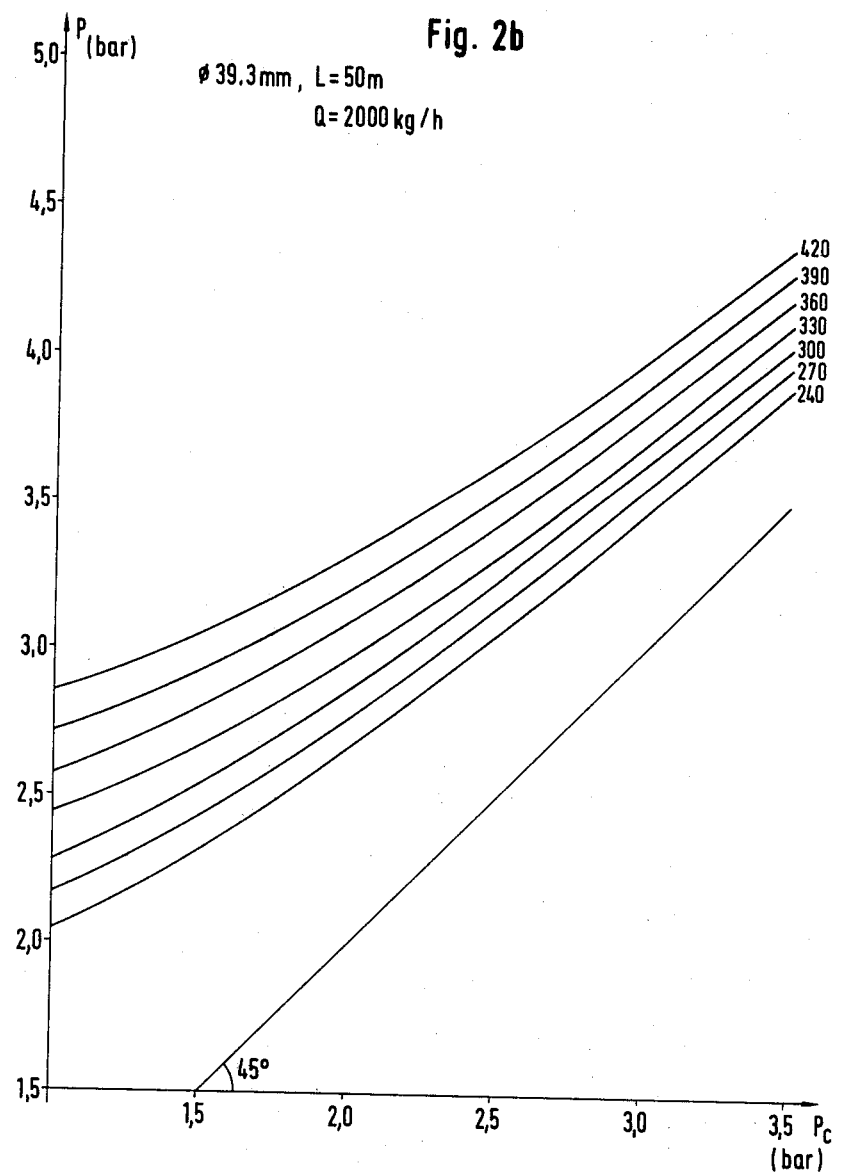

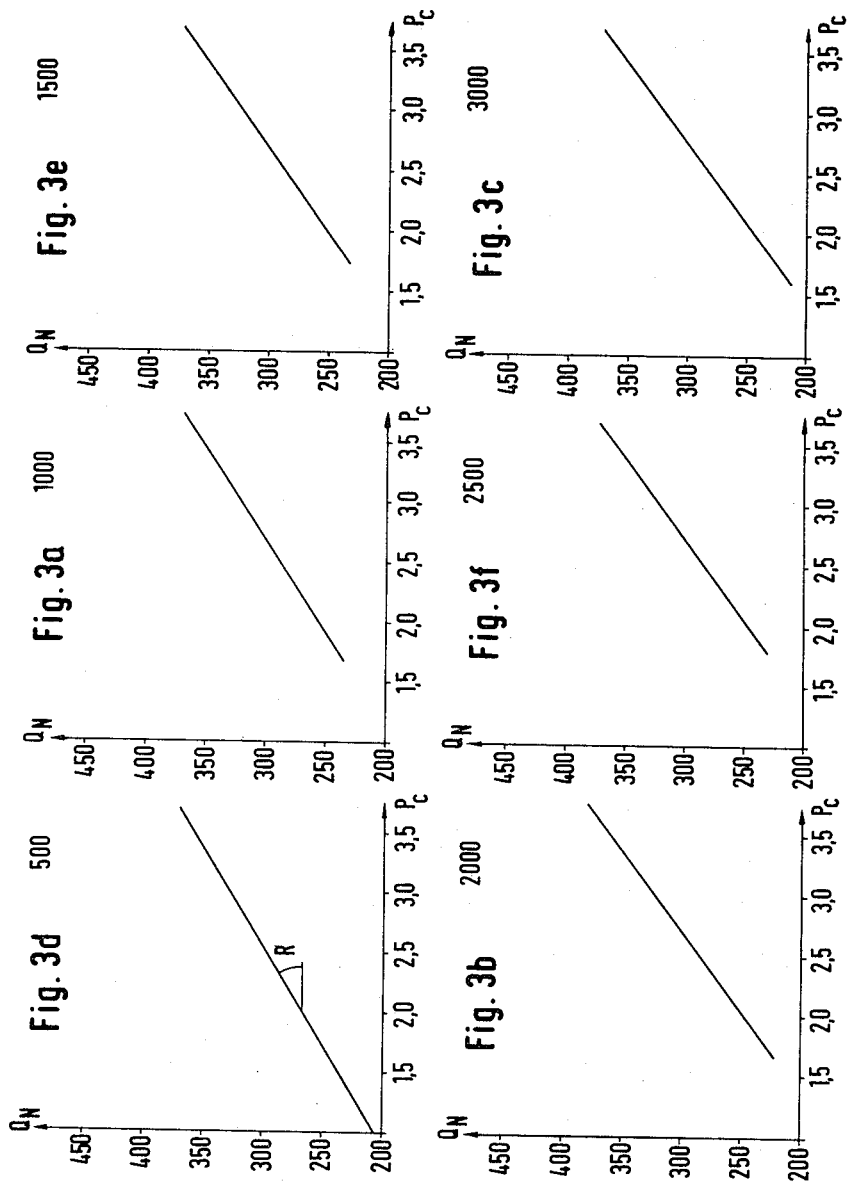

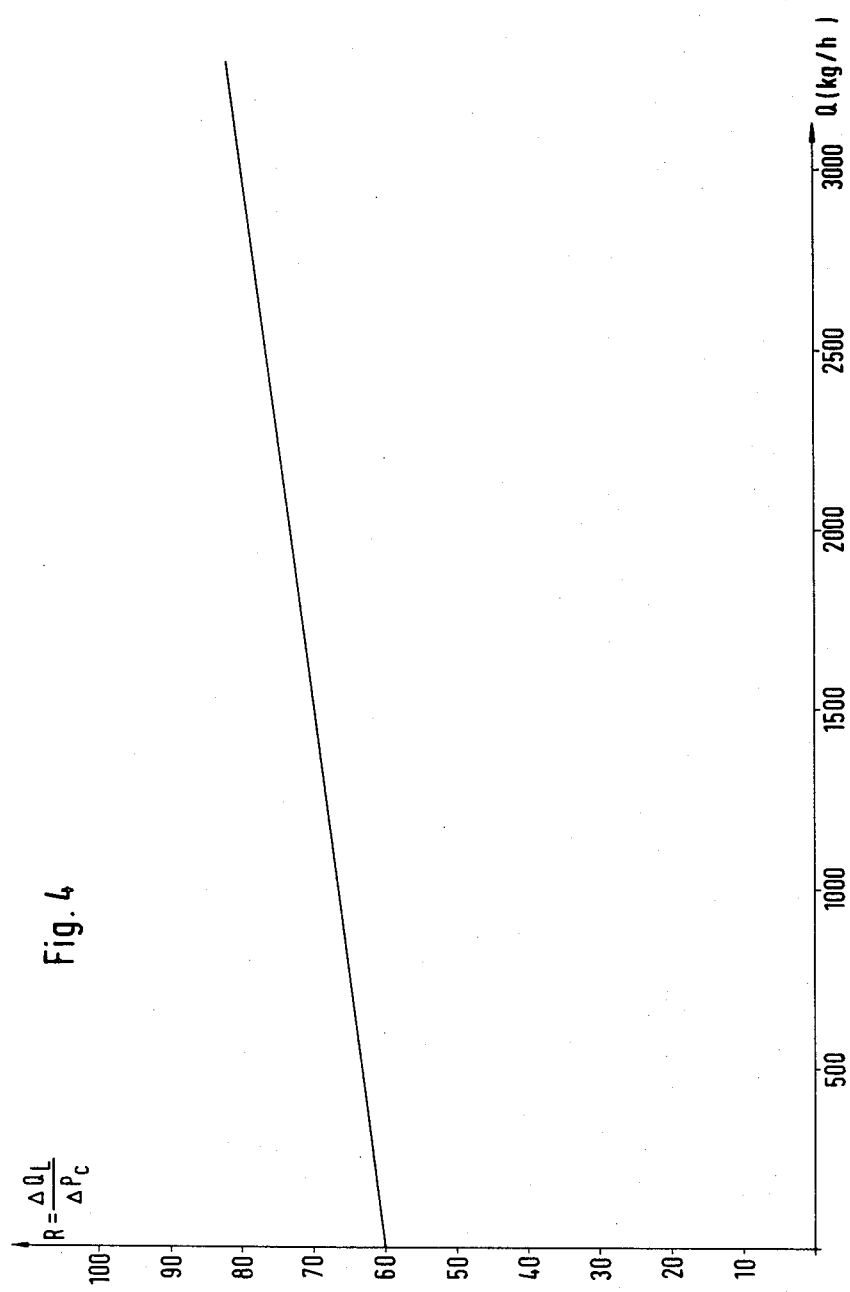

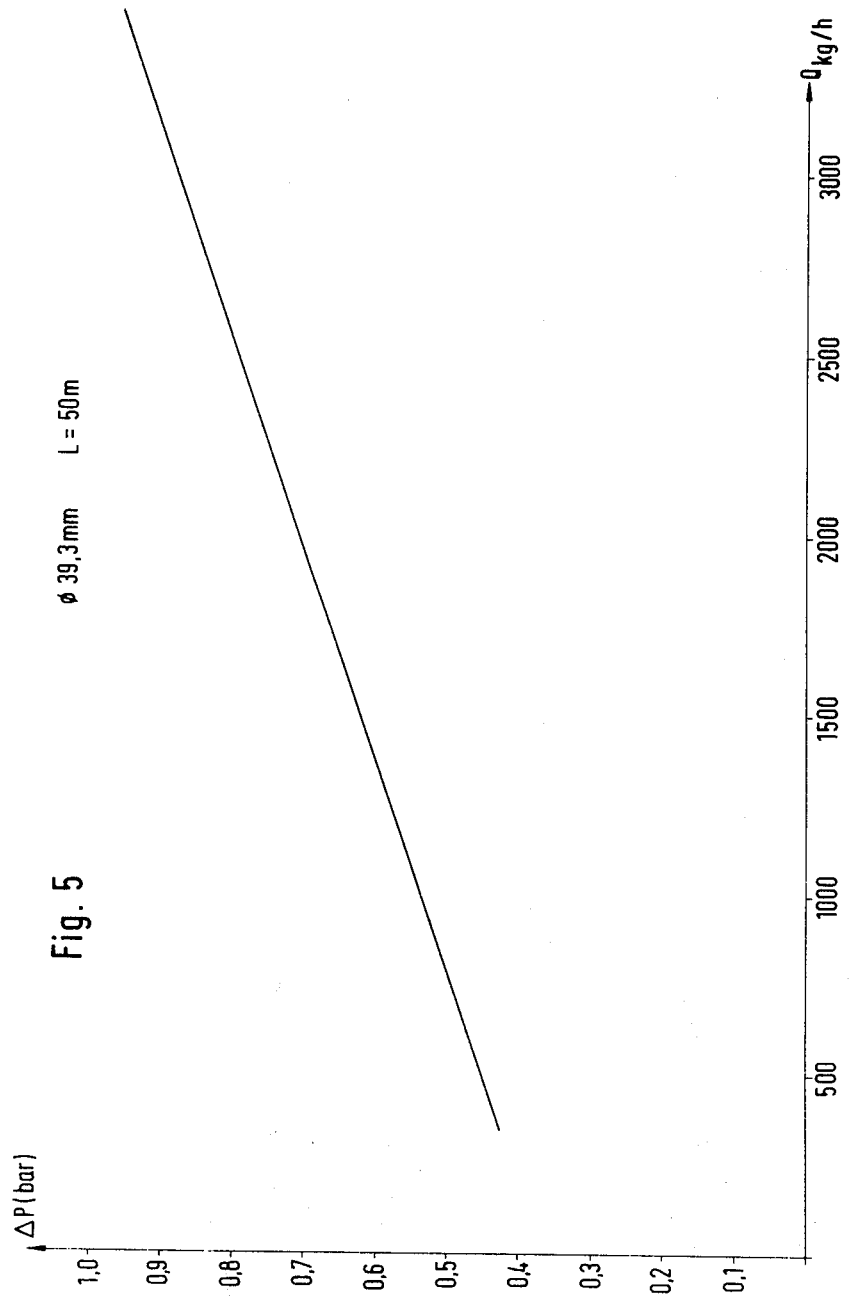

INJECTION OF PULVERIZED MATERIAL INTO A PRESSURIZED FURNACE

BACKGROUND OF THE INVENTION (1) Field of the Invention

The present invention relates to the injection of pulverized materials into an enclosure wherein a high pressure, which is subject to variation, is maintained and particularly to the delivery of combustible solid material to the interior of a furnace without disturbing the desired furnace operating conditions. More specifically, this invention is directed to apparatus for supplying finely divided solid fuel to a shaft furnace through its tuyeres. Accordingly, the general objects of the present invention are to provide novel and improved methods and apparatus of such character.

(2) Description of the Prior Art

While not limited thereto in its utility, the present invention is particularly well suited for use in the delivery of pulverized coal to the interior of a pressurized shaft furnace of the type employed in the reduction of ore to produce cast iron. Such shaft furnaces are conventionally provided with a circular exterior conduit which is connected to the base of the furnace by a plurality of tuyere stocks and associated injection nozzles. The arrangement of circular conduit, tuyere stocks and injection nozzles accomplishes the injection of hot air blasts into the furnace. The heated air supplied to the circular conduit is produced in an installation comprising a booster (compressor), a set of cowpers (also known as hot-blast stoves) and a mixing station. A tuyere stock is depicted in U.S. Pat. No. 3,662,696 whereas reference may be had to U.S. Pat. No. 4,145,033 for a disclosure of a cowpers. In order to operate the furnace at maximum efficiency, a variable high pressure must be maintained therein and the temperature of the "hot blast" must be accurately controlled. The mixing station will typically proportion the relatively cool output of the booster with the hot air being furnished by the cowpers to thereby maintain the desired air temperature in the circular conduit and tuyere stocks.

In the interest of maintaining the reduction process within the furnace, it is common practice to add a fuel to the hot air blast. The fuel is typically injected into the tuyere stocks immediately upstream of the injection nozzles. In the prior art, because of the ease of handling and the abundance and comparatively modest cost thereof, it has been customary to add fuel in liquid form, particularly petroleum, to the hot air blast. A particular advantage incident to the use of a liquid fuel such as oil resides in the fact that its injection into the hot air blast does not have any significant disturbing effect on the temperature of the air.

In view of the increasing costs and uncertain future availability of suitable liquid fuels, the replacement of such liquid fuels by other combustible materials, and particularly materials such as coal which are in abundant supply, has become of the utmost importance. It is recognized that these solid fuels have the same ability as the liquid fuels for maintenance of the reduction process in a blast furnace. However, there are many serious obstacles to a change from the use of liquid fuels, such as oil, to solid fuels, such as pulverized coal. These obstacles include, but are not limited to, the difficulty in metering the quantity of fuel injected into the furnace and in preventing the fuel stream, and particularly the transport air for the pulverized solid fuel, from having a deleterious effect on the temperature of the hot air blast. A further complication resides in the necessity of raising the pressure of the fuel stream comprising the pulverized solid material to a level above that being maintained within the furnace whereby injection is possible.

A first of the above-discussed problems, particularly the manner of pressurizing the pulverized material containing fuel stream to a level above the pressure being maintained within the furnace, has been solved by the technique and apparatus disclosed in copending application Ser. No. 158,612, filed June 11, 1980 and assigned to the assignee of the present invention. Application Ser. No. 158,612 is incorporated herein by reference.

The process and apparatus of above-referenced application Ser. No. 158,612 does not solve the problem of the disturbance of the temperature of the hot air blast by the carrier or transport gas comprising the pulverized material containing fuel stream. This transport gas must, of course, be at a comparatively low temperature to insure that there will be no ignition of the pulverized combustible material within the delivery system. The latter problem, however, is addressed and solved by the process and apparatus disclosed in copending U.S. patent application Ser. No. 166,618 filed July 17, 1980 and also assigned to the assignee of the present invention. Application Ser. No. 166,618 is also incorporated herein by reference. In the process of said application Ser. No. 166,618, some of the "cold" air intended for the mixing station downstream of the cowper stoves is employed as the transport air for the pulverized solid fuel. Accordingly, the total quantity of "cold" air ultimately mixed with the hot blast in order to obtain a constant hot blast temperature does not vary. Rather, the mixing of the "cold" air with the hot air occurs at two stations; i.e., at the conventional mixing station and at the point of injection of the solid fuel into the blast pipes or tuyeres.

Continuing to refer to copending application Ser. No. 166,618, it was recognized that a loss in pressure would be encountered in the pneumatic feed line for the fuel stream. In the invention of application Ser. No. 166,618, it is proposed to employ a booster compressor, positioned upstream of the point of addition of the pulverized solid fuel, in order to compensate for this pressure loss and to thereby insure that the mixture of transport gas and pulverized fuel would be at a sufficiently high pressure to insure the injection thereof into the furnace against the counter pressure prevailing within the furnace. Since the pressure in a typical blast furnace is not constant, and in fact may vary over a range of 1.5 bar, there is obviously a problem presented in exercising proper control over the output pressure of the booster.

A first possible solution to the problem discussed immediately above would be to cause the booster to constantly provide an output pressure commensurate with the extreme operating conditions and particularly with the maximum pressure possible within the furnace with the maximum fuel requirement. From an economic viewpoint, however, this is an unacceptable solution since constantly operating the booster at a level commensurate with the extreme operating conditions would result in a considerable waste of energy with the furnace operating at other than the said extreme conditions and this waste of energy would have a serious detrimental effect on the cost price per ton of the cast iron produced.

A second apparent solution would be to control the operation of the booster as a function of the pressure variations within the furnace; the furnace pressure being constantly monitored and thus known. It has, however, been discovered that the fuel stream pressure loss is a function of both the density of the fuel stream; i.e., the quantity of pulverized solid fuel per unit of transport gas; and the pressure prevailing inside the furnace. Further, the fuel stream pressure drop is a non-linear function of furnace pressure. Accordingly, the second possible solution is not viable since the exercise of control over the booster so as to insure the minimum fuel stream pressure required for injection of the fuel into the furnace, in the face of the non-linearity of the ratio between the fuel stream pressure loss and the pressure fluctuations inside the furnace, is at best an exceedingly complicated task.

SUMMARY OF THE INVENTION

The present invention overcomes the above briefly discussed and other deficiencies and disadvantages of the prior art and, in so doing, provides a unique process which permits the injection of a pulverized solid material into a pressurized enclosure with minimum expenditure of energy. The process of the present invention, by regulating various parameters of the pulverized material-carrier gas stream in an uncomplicated manner, causes the solid material to be injected into the enclosure under optimum conditions. The present invention also comprises apparatus for use in the practice of the above-mentioned novel process and particularly an installation for use in the injection of pulverized solid fuel into a shaft furnace.

Thus, in accordance with the present invention predetermined quantities of pulverized materials are added to a pressurized carrier gas stream to define a stream which may be delivered into an enclosure subject to variable internal pressure. The carrier gas stream is provided by a booster compressor which is controlled as a function of the monitored pressure within the enclosure. Accordingly, pursuant to the present invention, the quantity of carrier gas will be controlled to be as small as possible while the velocity of the carrier gas will be regulated so as to always be of sufficient magnitude to obviate the possibility of the supply conduit becoming plugged. The technique of the present invention, in a preferred embodiment, particularly comprises the steps of continuously monitoring the pressure variations in a fuel stream feed conduit and regulating the quantity of pulverized solid material introduced into the said feed conduit so as to maintain the pressure drop along the feed conduit at a predetermined value.

Also in accordance with the preferred embodiment of the present invention, the quantity of the pressurized carrier gas delivered to the fuel stream feed conduit will be regulated in accordance with a linear function of the pressure fluctuations within the enclosure to which the fuel stream is being delivered. As a result of this manner of regulation of the quantity of carrier gas, which will customarily be air, the pressure loss in the feed conduit will be generally constant for a given quantity of pulverized material and this constant relationship will apply throughout the entire range of pressure variations within the enclosure to which the stream is being delivered. Restated, in accordance with the present invention, the relationship between the pressure required in the feed conduit and the pressure within the furnace or other enclosure has been linearized. This linearization of the pressure relationship, in turn, enables the booster to be controlled in an uncomplicated manner, adopting its operating conditions to the pressure variations in the furnace or other enclosure.

The above-discussed linearization of the relationship between the carrier gas supply pressure and the enclosure internal pressure produces a linear relationship between the pressure loss in the feed conduit and the total quantity of pulverized material to be delivered per unit of time. Accordingly, as noted above, the introduction of the pulverized solid material into the feed conduit may be controlled as a function of variations in the pressure drop in the feed conduit; i.e., the pressure drop in the feed conduit may be maintained at a level corresponding to the quantity of pulverized material to be injected into the furnace or other enclosure per unit of time by means of exercising control over the introduction of the said material into the conduit.

Apparatus in accordance with the present invention comprises means for controlling the introduction of pulverized solid material into a feed conduit which is connected, at a first end, to a booster or compressor which delivers a transport gas to the said conduit. The said apparatus further includes a control valve positioned in the conduit between the booster and the means for controlling the introduction of the pulverized material into the conduit. This valve is adjusted as a function of the pressure existing within the enclosure to which the second end of the feed conduit is coupled.

In accordance with the preferred embodiment of the present invention, the means through which the pulverized material is introduced into the feed conduit comprises a rotary valve. The speed of rotation of this valve is controlled as a function of pressure variations, and particularly the pressure drop per unit of length, in the feed conduit downstream of the said rotary valve.

Also in a preferred embodiment, the present invention is employed in the delivery of pulverized solid fuel to the interior of a shaft furnace wherein there is a single pneumatic feed conduit, having installed therein a carrier gas control valve and a pulverized material rotary feed valve, for each pair of tuyeres; the fuel stream comprising the pulverized solid fuel being divided and injected into the tuyeres of each of said pairs.

BRIEF DESCRIPTION OF THE DRAWING

The present invention may be better understood and its numerous objects and advantages will become apparent to those skilled in the art by reference to the accompanying drawing wherein:

FIG. 1 is a graphical illustration of the relationship between the supply pressure of the carrier gas which comprises the stream of pulverized solid material and the pressure prevailing within the shaft furnace or other enclosure for various stream densities;

FIGS. 2a, 2b and 2c are graphical representations, similar to FIG. 1, for different quantities of pulverized material and carrier gas;

FIGS. 3a, 3b, 3c, 3d, 3e and 3f show, for different quantities of pulverized material, the linear relationship between the quantity of carrier gas and the pressure prevailing within the enclosure to which the stream is delivered;

FIG. 4 is a graphical showing of the linear relationship between the various curves of FIGS. 3a–3f and the quantity of pulverized material to be fed to the enclosure per unit of time;

FIG. 5 depicts the linear relationship between the pressure loss in the pulverized material-carrier gas stream in the feed conduit and the quantity of pulverized material being delivered to the enclosure per unit of time.

DESCRIPTION OF THE PREFERRED EMBODIMENT

Figure 2C:
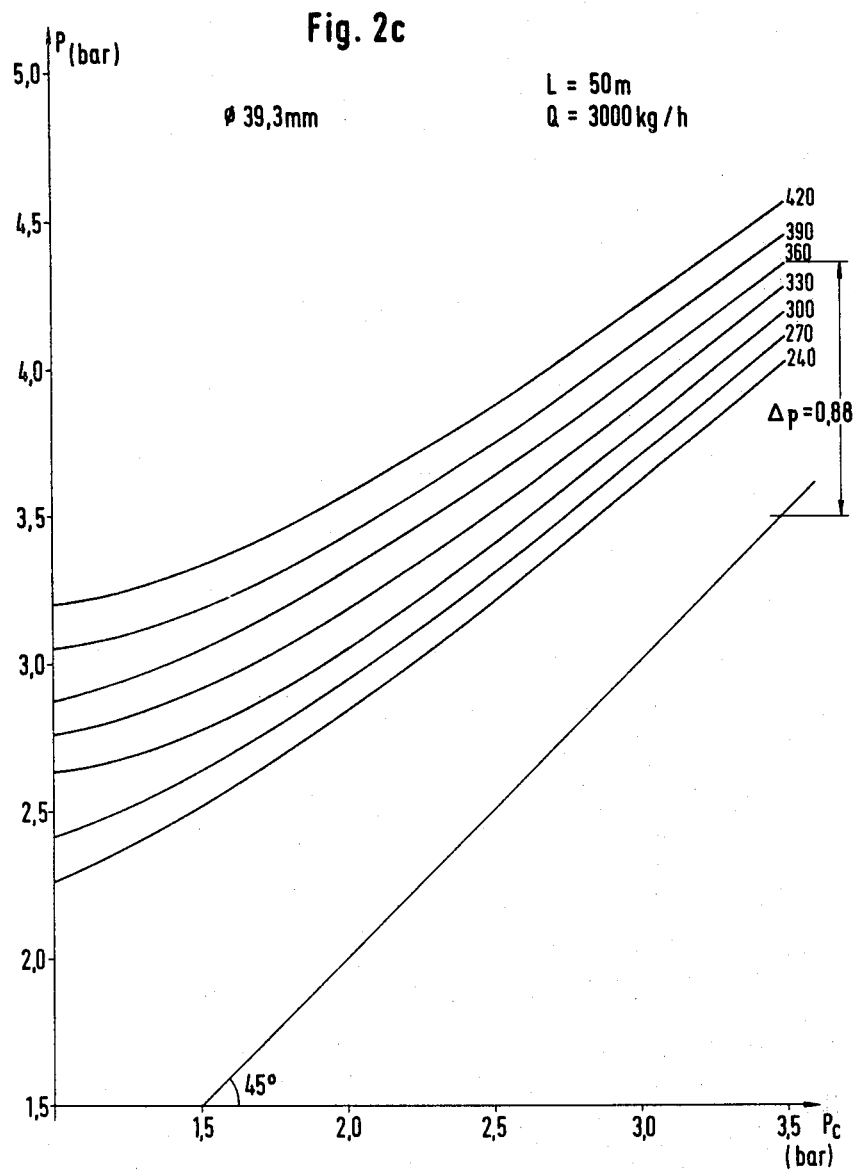

A preferred embodiment of the present invention will be described below. It will be assumed, for purposes of explanation, that the invention is employed with an installation such as that described in referenced copending U.S. application Ser. No. 166,618. Accordingly, the description below will principally be related to the use of "cold" air as the carrier gas and pulverized coal as the solid material which is entrained in the carrier gas to form a fuel stream. The description below will also relate the use of the present invention to the environment of a blast furnace. It is, however, to be noted that the present invention may be employed with other carrier or transport fluids, different pulverized materials and dissimilar pressurized vessels.

With reference now to the drawing, FIG. 1 consists of a family of curves which show the minimum carrier gas source pressure P; i.e., the pressure downstream of the booster; required in order to inject the stream of pulverized material into a pressurized blast furnace. The pressure prevailing within the furnace, and thus the counter-pressure against which the carrier gas-pulverized coal fuel stream is directed, is indicated by "$P_c$" on the abscissa of the graph and all pressures are shown in bar. The curves of FIG. 1 were calculated for a feed conduit having a length $\Delta L$ of 100 meters and for a carrier air supply rate $Q_N$ of 350 meters per hour. The pressure P, indicated on the ordinate of FIG. 1, is the pressure immediately downstream of the booster.

Continuing to refer to FIG. 1, the straight line at an angle of 45° originating at the intersection of the axes represents the static conditions corresponding to equilibrium; i.e., those conditions for which no circulation occurs in the feed conduit. FIG. 1 shows curves for four different fuel stream densities $\mu$; i.e., for four different values of the ratio of kilograms of pulverized coal per kilogram of carrier gas. The lower curve, for which $\mu$ is equal to 0, corresponds to the injection of pure air and each of the three remaining curves is for a fuel stream with increasing density. Thus, for example, the curve $\mu = 10$ represents the injection of 3500 kg of pulverized coal per hour.

The pressure loss in the feed conduit; i.e., the pressure difference $\Delta P$ between a point immediately downstream of the booster and the point of injection of the stream into the furnace; corresponds to the difference, on the ordinate, between a given point on one of the curves and a corresponding point on the straight line at 45° having the same abscissa. As the curves for the various fuel stream densities are not parallel, the pressure difference $\Delta P$ varies as a function of the absolute and momentary values of the pressure $P_c$ inside the furnace and, additionally, from one curve to another. While the pressure variation $\Delta P$ is relatively low for high levels of $P_c$, where the family of curves exponentially approaches the straight line at 45°, the $\Delta P$ variations are considerable at the lower levels of $P_c$. This is particularly true within the range of normal variation of the counter-pressure inside the furnace; i.e., between 2 and 3.5 bar.

It is to be noted that FIG. 1 depicts the optimum pressure curves; i.e., FIG. 1 represents operation under the condition where the pressure P is at the minimum level sufficient to obviate the possibility of the formation of a "plug" in the feed conduit. For carrier gas source pressures P above the levels depicted by the curves of FIG. 1, for example a pressure P of 7 bar for $P_c = 3$ bar and $\mu = 10$ rather than P=5 bar as shown, higher values of P will obviously fulfill the conditions required for injection. However, these higher source pressures would be disadvantageous from an economic viewpoint since the obtaining of the pressures would require that the booster be operated at a level, for example an unnecessarily high rotational speed, commensurate with a costly waste of energy. On the other hand, for the reasons set forth above in the description of the prior art, the booster cannot be controlled so as to always operate at a rate corresponding to the optimum conditions depicted in FIG. 1.

Referring now simultaneously to FIGS. 2a, 2b and 2c, families of curves similar to those depicted in FIG. 1, for different parameters and initial conditions, are shown. Thus, FIG. 2a shows a family of curves analogous to the curves of FIG. 1 and clarifies the relationship between the pressure P immediately downstream of the booster and the counter-pressure $P_c$ within the furnace or other pressurized enclosure. For the curves of FIG. 2a, the constant initial values are the length of the feed conduit L; i.e., 50 meters; the diameter of the feed conduit $\phi$; i.e., 39.3 mm; and the quantity Q of pulverized material; i.e., 1000 kg/hr of coal. In FIG. 2a the variable parameter, corresponding to the various curves, is the quantity of carrier air $Q_N$ in cubic meters per hour.

FIG. 2b depicts a family of curves analogous to those of FIG. 2a but for a quantity of coal, Q, of 2000 kg/hr. In FIG. 2c the quantity of pulverized coal, Q, is 3000 kg/hr. A comparison of FIGS. 2a, 2b and 2c will show that, for otherwise identical conditions, an increase in the quantity Q of pulverized coal results in the curves of each family becoming further separated; i.e., the pressure loss $\Delta P$ is proportional to the quantity of pulverized material entrained in the carrier gas. Thus, for a given counter-pressure $P_c$, such as 2.5 bar, the pressure P is higher for each of the curves of FIG. 2b than for the corresponding curves of FIG. 2a. Conversely, the pressure P for each of the curves of FIG. 2b is lower than the pressure for the corresponding curve of FIG. 2c.

A linear relationship between the booster discharge pressure P and the counter-pressure $P_c$ would be represented, in FIGS. 2a, 2b and 2c, by straight lines. Such imaginary linear curves, which would be parallel to those shown as extending from the abscissa at an angle of 45°, would correspond to a pressure loss $\Delta P$ which was constant over the entire length of the feed conduit for all values of $P_c$. The imaginary straight line curves would intersect the curves of the families shown in FIGS. 2a, 2b and 2c; these curves being characterized by the quantity of carrier gas being the variable parameter. Accordingly, if the quantity of air injected into the feed conduit for the purpose of carrying the pulverized material were varied in a suitable manner, it is conceivable that a linear relationship would prevail between the pressure P and the counter-pressure $P_c$ and this linear relationship could be represented by the aforementioned imaginary straight line curves.

By drawing lines parallel to the straight lines at 45° which are represented on FIGS. 2a, 2b and 2c; i.e., straight line curves corresponding to a constant ΔP; the points of intersection with the different curves of the families of these FIGURES may be found and these points of intersection may be employed to prepare a plot of the relationship between the quantity $Q_N$ of carrier gas and the counter-pressure $P_c$. These plots of carrier gas quantity versus counter-pressure are illustrated in FIGS. 3a-3f for different quantities of pulverized coal; i.e., for Q=500, 1000, 1500, 2000, 2500 and 3000 kg/hr. The curves represented in FIG. 3, however, have not been plotted graphically but have been calculated point by point, from the following formula:

$$\Delta P = (L/d)(W^2 L/2g)(\gamma_L)(\lambda_L + \lambda_Z \mu) \quad (1)$$

Wherein

ΔP=the pressure loss between the booster and the point of injection into the furnace;

L=the length of the feed conduit d=the diameter of the feed conduit

W=the velocity of the carrier gas g=9.81

$\gamma_L$=the specific gravity of the air $\mu$=the density of the stream in kg of coal per kg of air; and $\lambda_L$ and $\lambda_Z$=auxiliary coefficients referring to air and pulverized coal, respectively, and constant for a given pressure.

The graphs of FIGS. 3a-3f show that, for a pressure loss ΔP which is constant over the entire range of counter-pressure $P_c$ variations, the quantity of carrier gas is a linear function of counter-pressure. Thus, by varying the quantity of carrier gas as a linear function of $P_c$, the pressure loss ΔP may be maintained constant over the entire length of the feed conduit and the pressure immediately downstream of the booster may be varied as a linear function of the counter-pressure in the furnace.

The above-discussed linear relationship between the carrier gas quantity and furnace pressure enables a much less complicated mode of exercise of control over the booster than would result from an attempt to follow the curves of FIG. 1. Thus, in accordance with the present invention, a single exceedingly complicated control procedure is avoided and, in place thereof, and two straightforward linear regulating operations are performed; i.e., the booster output pressure and the quantity of carrier gas are both controlled as a linear function of the furnace pressure.

The graphs of FIGS. 3a-3f have been plotted for a carrier gas velocity of 15 m/sec which corresponds to the velocity required to insure circulation in the feed conduit and obviate the risk of the formation of "plugs".

It is also to be noted that, in order to enable the graphs of FIGS. 3a-3f to be plotted in accordance with equation (1), the value of ΔP has been arbitrarily selected at a level which will insure injection with the maximum fuel injection rate. These conditions apply when the counter-pressure $P_c$ in a furnace is at its maximum; i.e., 3.5 bar; for an injection of 300 kg of pulverized coal per hour. For this maximum injection rate, 360 m³ of air per hour is sufficient. Referring again to FIG. 2c, it may be seen that for a counter-pressure of 3.5 bar and a fuel delivery rate of 3000 kg/hr per hour, the pressure for the curve corresponding to 360 m³ of carrier gas is 0.88 bar above the straight line at 45°; i.e., for 3000 kg of pulverized coal per hour the pressure loss ΔP amounts to 0.88 bar.

Calculating this pressure loss ΔP for each of the quantities of coal dust for which the graphs in FIGS. 3a-3f have been drawn, and representing the resulting six values of ΔP graphically as a function of the quantity Q of pulverized coal, the graph shown in FIG. 5 is obtained. FIG. 5 shows that there is a linear relationship between P and the quantity of entrained pulverized material when the quantity of carrier gas bears a linear relationship to the counter-pressure $P_c$ according to FIGS. 3a-3f.

FIGS. 3a-3f also show that the gradient; i.e., the slopes; of the various linear curves increases with the quantity of pulverized material to be entrained in the pressurized carrier gas. Calculating the gradient $\Delta Q/\Delta P_c$ for each of FIGS. 3a-3f, and plotting the relationship as a function of the quantity Q of the pulverized material, a further linear relationship may be shown. For example, the gradient of FIG. 3c for 3000 kg of pulverized coal is equal to 80, while that of FIG. 3e for 1500 kg of pulverized coal is equal to 70. The gradient for Q=0; i.e., for "pure" air; is found by extrapolation to be equal to 60. This relationship is shown in FIG. 4 wherein the gradient of the linear curve is 20/3000 which, of course, reduces to 1/150. This relationship may thus be expressed as follows:

$$R = 60 + (Q \times 1/150) \quad (2)$$

The graph of FIG. 4 therefor permits the determination, for any quantity of pulverized coal to be injected, of the gradient of the straight line representing the variation in the quantity of carrier gas $Q_N$ is a function of the furnace counter-pressure $P_c$ as shown in FIGS. 3a-3f. There is, therefor, one definite quantity of carrier gas for each particular counter-pressure and quantity of pulverized coal to be injected.

As noted above, FIG. 5 shows that there is a linear relationship between ΔP and the quantity of pulverized material Q when the quantity of carrier gas $Q_N$ bears a linear relationship to the counter-pressure $P_c$. FIG. 5 plots the pressure drop for each quantity of pulverized material and thus gives the pressure which must prevail downstream of the booster in order to inject a certain given quantity of pulverized material into the furnace. For example, to inject 2500 kg of pulverized coal per hour the ΔP is equal to 0.8 bar; i.e., the pressure P must be 0.8 bar above that prevailing in the furnace ($P_c$). Since the pressure loss must remain constant, the graph of FIG. 5 may be employed as a control parameter to insure the automatic adjustment of the fuel stream parameters to fulfill this condition. It is to be noted that, for control purposes, it is sufficient to measure the pressure at any two points along the conduit through which the stream of entrained pulverized material flows and to monitor the pressure difference between these two points. If a ΔP fluctuation occurs; i.e., a momentary departure from the reference value; the quantity Q of the pulverized material may be varied slightly in order to restore the desired operating conditions.

Figure 6:
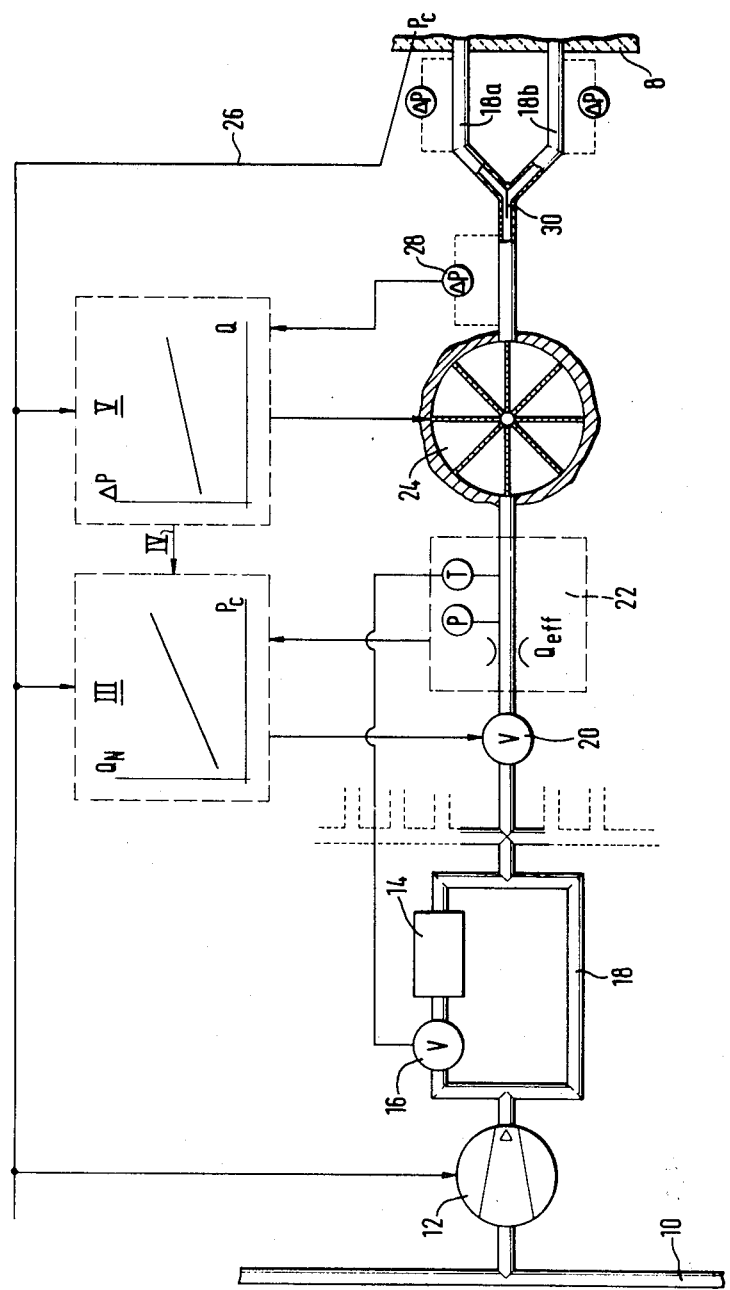
FIG. 6 is a schematic illustration of a preferred embodiment of apparatus for use in performance of the process of the present invention.

Referring now to FIG. 6, apparatus for forming a fuel stream comprising pulverized coal entrained in compressed air and subsequently injecting this stream into a shaft furnace is depicted schematically. In FIG. 6 the furnace wall is indicated at 8. For a disclosure of the source of the carrier gas, reference may be had to copending application Ser. No. 166,618; supply pipe 10 of FIG. 6 corresponding to pipe 24 of the referenced copending application. Thus, pipe 10 will be connected upstream of a mixing station associated with the cowper stoves which provide the hot blast air and will receive some of the "cool" air which would otherwise be delivered to the mixing station.

A booster 12, which will typically be a reciprocating piston type compressor, receives the air from pipe 10 and supplies it to the fuel stream forming and delivery system, to be described below, in sufficient quantities $Q_N$ and at a pressure P required to entrain the pulverized coal and insure its injection into the furnace. It will be understood that booster 12 includes a controller and drive motor thus enabling the output pressure of booster 12 to be varied. Since it is mandatory that the temperature of the carrier gas be maintained below the ignition temperature of the combustible solid material to be entrained, a cooler 14 will be positioned downstream of booster 12. Cooler 14 will serve to compensate for the heating of the carrier gas which occurs in booster 12. In the disclosed embodiment, cooler 14 is connected in parallel with a bypass conduit 15 and the portion of the transport air which is passed through cooler 14 is controlled by means of a valve 16. The control for valve 16 is effected by monitoring the temperature of the carrier gas downstream of the mixing point defined by the junction of bypass conduit 15 and the outlet of cooler 14. Thus, if the temperature of the carrier gas in the fuel stream supply conduit upstream of the feed point for the pulverized coal increases to an unsafe level, valve 16 will automatically be opened so as to increase the quantity of compressed air passing through cooler 14.

The fuel stream supply conduit is also provided, preferably at a position downstream of the above-mentioned mixing point, with an automatically adjusted flow control valve 20. The quantity of carrier gas which is passed through valve 20 is regulated by adjusting the valve opening. Valve 20 will thus include a suitable actuator responsive to a control signal generated in the manner to be described below.

The temperature sensor for providing the signal for controlling the above-discussed valve 16, as well as means for sensing the carrier gas flow rate and pressure, form part of a control device 22 associated with the fuel stream supply conduit 18 downstream of valve 20. The control device 22 thus includes a temperature sensor and means for comparing the sensed temperature with a reference level whereby a temperature error signal is generated and delivered to the controller of valve 16. Control device 22 also includes a pressure sensor for providing a signal commensurate with the pressure P in the conduit upstream of the feed point for the pulverized coal. Control device 22 further includes a conventional flow meter for measuring the actual quantity of air circulating in the conduit and providing a signal $Q_{eff}$ commensurate therewith.

A rotary valve 24 is interposed in the fuel stream conduit 18 downstream of control device 22. The rotary valve 24 may comprise a conventional rotary air lock feeder which includes an adjustable speed drive motor. The pulverized coal is fed into the conduit from a source, not shown, by means of the rotary valve 24. Th quantity of pulverized coal which will be fed into the conduit per unit of time will be a function of the speed of rotation of valve 24.

In the installation represented schematically in FIG. 6, a pair of blast pipes or tuyeres are simultaneously fed with the fuel stream which results from the entrainment of the pulverized coal in the carrier gas. Accordingly, downstream of rotary valve 24 the fuel stream supply conduit is divided into branches 18a and 18b which directly communicate with a pair of blast pipes having nozzles which project through the wall 8 of the furnace. Thus, in accordance with the arrangement depicted in FIG. 6, a rotary pulverized material supply valve 24 and associated supply conduit is provided for each pair of blast pipes and the supply conduits 18 are all branched off a common compressed gas supply conduit connected to receive the carrier gas at a point downstream of the mixing point for the bypass conduit 15 and outlet of cooler 14.

The pressure $P_c$ in the furnace is, of course, constantly monitored and a signal commensurate therewith delivered, via line 26, to the controller for the drive motor of booster 12 and to a pair of function generators III and V. The controller for booster 12 will, in response to the $P_c$ signal, adjust the speed of rotation of the drive motor, and thus also of the compressor, linearly as a function of $P_c$. Accordingly, the carrier gas source pressure will vary with the instantaneous counter-pressure in the furnace so as to provide a pressure differential which matches the curve of FIG. 5. The speed control signal for the booster compressor drive motor will be calculated by the controller in response to the $P_c$ signal and a signal commensurate with actual sensed pressure as provided by control device 22. Thus, the motor controller may calculate a signal commensurate with the desired P as a linear function of $P_c$ and then compare the desired and actual values of P to generate an error signal for application to the drive motor.

In addition to the signal $P_c$ commensurate with instantaneous furnace pressure, the function generator III also receives the signal $Q_{eff}$ commensurate with carrier gas flow rate provided by control device 22. Function generator III also receives a signal, provided by function generator V, commensurate with the pulverized material feed rate Q. Function generator III provides the control signal for the actuator of valve 20 whereby the opening of valve 20, and thus the carrier gas flow rate $Q_N$, will be varied as a function of the furnace counter-pressure $P_c$.

It should be noted that the quantity of air which passes through the fuel stream supply conduit, in addition to being a function of the position of flow control valve 20, is a function of the pressure and temperature of the carrier gas. In order to avoid the necessity of having to compensate for temperature and pressure, the relationships depicted in FIGS. 1–5 have been based upon normal or "standard" values of these parameters and the flow rate represented by $Q_N$. The relationship between the normal or "standard" carrier gas qunatity $Q_N$ and the quantity actually circulating in the conduit; i.e., $Q_{eff}$ may be represented by the following dual equations:

$$Q_{eff} = (Q_N)(1/P)((273° + T°)/273°) \tag{3}$$

$$Q_N = (Q_{eff})(P)(273°/(273° + T°)) \tag{4}$$

Consequently, in order to insure the correct position of valve 20 and thereby establish the desired carrier gas flow, the value of $Q_N$ is corrected in function generator III by also delivering thereto the signals commensurate with temperature and pressure as measured by the sensors in control device 22. Thus, function generator III will, in response to the $P_c$ signal and a Q signal provided by function generator V, generate a signal which varies linearly in accordance with relationships depicted in FIGS. 3a–3f; the slope of the thus generated signal being calculated pursuant to equation (2) above and varying as shown in FIG. 4. The appropriate curve having been generated, the value of $Q_N$ will be determined as a function of the instantaneous value of $P_c$ and a signal commensurate therewith generated. This signal will then be corrected for temperature and pressure pursuant to equation (3) above and the corrected signal applied as the control input to the actuator for valve 20.

The rotary valve 24 is operated under the control of function generator V in accordance with the relationship depicted in FIG. 5. For this purpose a pair of pressure sensors are inserted in the fuel stream supply conduit downstream of valve 24 and the outputs of these pressure sensors are compared, in a comparator device 28, to produce a ΔP signal for delivery as the second input to function generator V; the first input to function generator V being the selected Q signal. As discussed above, the total pressure loss for a given quantity of pulverized coal to be injected into the furnace may be calculated and is a linear function. Thus, by measuring the ΔP between any two points in the supply conduit downstream of the delivery point of the pulverized coal, the total ΔP may be calculated and employed to "fit" the Q value to the curve. Any variation in the measured ΔP will result in the function generator V providing a control signal to the actuator for valve 24 which increases or reduces, as necessary, the quantity Q of the pulverized coal being delivered into the fuel stream supply conduit as necessary to restore the desired ΔP value. The reference value of ΔP against which the signal provided by comparator 28 is compared will, of course, be commensurate with the preselected fuel delivery rate commensurate with the desired furnace operation and the actual fuel feed rate will be varied about this preselected level pursuant to the output of function generator V.

As noted above, in order to adhere to the condition represented by FIG. 4, the function generator III is made subordinate to function generator V as represented by the connection IV between these two devices. This insures the correct quantity of air $Q_N$ as a function of the prevailing counter-pressure $P_c$ and as a function of the quantity of pulverized coal Q supplied through valve 24.

Since the density of the mixture flowing in the fuel feed supply conduit will not always be uniform across this conduit, at the point where the supply conduit is divided into branches 18a and 18b it is advantageous to provide an adjustable deflector 30 which may be controlled so as to insure equal distribution of the quantity of pulverized coal between the two said branches. For this purpose, the pressure drops along preselected equal lengths of each of the branch conduits 18a and 18b may be measured as shown, and the results of these measurements compared for the purpose of generating a control signal for deflector 30.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A process for the injection of pulverized solid material into a pressurized vessel including the steps of:
controllably pressurizing a carrier gas;
delivering the pressurized carrier gas to a conduit;
controlling the volume flow rate of the carrier gas in the conduit;
controllably feeding the pulverized material into the conduit whereby it will be mixed with and entrained in the carrier gas;
injecting the mixed carrier gas-pulverized material stream into the vessel;
monitoring the pressure in the vessel;
monitoring the pressure drop along at least a portion of the conduit downstream of the pulverized material feed point;
varying the pulverized material feed rate to maintain the pressure drop at a predetermined level; and
varying the volume flow rate of the carrier gas as a function of the vessel pressure.

2. The process of claim 1 wherein the step of varying the volume flow rate of the carrier gas comprises:
adjusting the quantity of carrier gas flowing through the conduit per unit of time as a linear function of the instantaneous vessel pressure.

3. A process for the injection of pulverized solid material into a pressurized vessel including the steps of:
controllably pressurizing a carrier gas;
delivering the pressurized carrier gas to a conduit;
controlling the volume flow rate of the carrier gas in the conduit;
controllably feeding a pulverized material into the conduit whereby it will be mixed with and entrained in the carrier gas;
injecting the mixed carrier gas-pulverized material stream into the vessel;
monitoring the pressure in the vessel;
monitoring the pressure drop along at least a portion of the conduit downstream of the pulverized material feed point;
varying the pulverized material feed rate to maintain the pressure drop at a predetermined level; and
varying the volume flow rate of the carrier gas by changing the relationship between the vessel pressure and carrier gas flow rate as a function of the feed rate of the pulverized material while maintaining the linearity of the said relationship.

4. The process of claim 1 further comprising:
varying the pressure of the carrier gas as a function of the monitored vessel pressure to maintain a carrier gas pressure greater than the monitored pressure.

5. The process of claim 3 further comprising:
varying the pressure of the carrier gas as a function of the monitored vessel pressure to maintain a carrier gas pressure greater than the monitored pressure.

6. A process for the injection of pulverized solid material into a pressurized vessel including the steps of:
controllably pressurizing a carrier gas;
delivering the pressurized carrier gas to a conduit;
controlling the volume flow rate of the carrier gas in the conduit;
cooling at least a portion of the pressurized carrier gas prior to mixing a pulverized material therewith;
controllably feeding a pulverized material into the conduit whereby it will be mixed with the entrained in the carrier gas;
injecting the mixed carrier gas-pulverized material stream into the vessel;
monitoring the pressure in the vessel;

monitoring the pressure drop along at least a portion of the conduit downstream of the pulverized material feed point;

varying the pulverized material feed rate to maintain the pressure drop at a predetermined level; and varying the volume flow rate of the carrier gas as a function of the vessel pressure.

7. The process of claim 5 further comprising:

cooling at least a portion of the pressurized carrier gas prior to mixing the pulverized material therewith.

8. The process of claim 2 wherein the step of varying the volume flow rate of the carrier gas further comprises:

monitoring the pressure and temperature of the carrier gas prior to mixing the pulverized material therwith; and adjusting the volume of carrier gas flow as a function of the monitored temperature and pressure.

9. The process of claim 3 wherein the step of varying the volume flow rate of the carrier gas further comprises:

monitoring the pressure and temperature of the carrier gas prior to mixing the pulverized material therewith; and adjusting the volume of carrier gas flow as a function of the monitored temperature and pressure.

10. The process of claim 5 wherein the step of varying the volume flow rate of the carrier gas further comprises:

monitoring the pressure and temperature of the carrier gas prior to mixing the pulverized material therewith; and adjusting the volume of carrier gas flow as a function of the monitored temperature and pressure.

11. The process of claim 1 wherein the pulverized material is combustible, the vessel is a shaft furnace and the carrier gas is air.

12. The process of claim 5 wherein the pulverized material is combustible, the vessel is a shaft furnace and the carrier gas is air.

13. The process of claim 10 wherein the pulverized material is combustible, the vessel is a shaft furnace and the carrier gas is air.

14. Apparatus for use in the injection of a pulverized solid combustible material into a pressurized furnace comprising:

means for pressurizing a carrier gas;

conduit means connected to said pressurizing means for receiving the carrier gas;

valve means positioned in said conduit means for regulating the quantity of carrier gas flowing therethrough;

means positioned in said conduit means downstream of said valve means for controllably feeding the pulverized combustible material into said conduit means whereby said pulverized material is entrained in the carrier gas to define a fuel stream;

means coupling said conduit means to the interior of a furnace at a point downstream of said pulverized material feed means whereby the fuel stream may be injected to the furnace;

means for monitoring the pressure within the furnace and generating a signal commensurate therewith;

means for monitoring the pressure drop along at least a portion of said conduit means downstream of said pulverized material feed means and generating a signal commensurate with the carrier gas pressure drop in said conduit means;

means responsive to said signal commensurate with pressure drop for generating a signal commensurate with a pulverized material feed rate corresponding to a predetermined pressure drop;

means delivering said feed rate signal to said means for feeding the pulverized material into said conduit means whereby the rate of delivery of the pulverized material into said conduit means is varied to maintain the pressure drop at the predetermined level;

means responsive to said signals commensurate with furnace pressure and pulverized material feed rate for generating a valve means control signal for adjusting said valve means whereby the volume flow rate of the carrier gas is varied as a function of furnace pressure; and means delivering said valve means control signal to said valve means.

15. The apparatus of claim 14 wherein said means for controlling said valve means comprises:

means responsive to said furnace pressure signal for generating a carrier gas flow rate quantity signal which varies as a linear function of the instantaneous furnace pressure; and means responsive to said pulverized material flow rate signal for varying said linear function in proportion thereto.

16. The apparatus of claim 14 further comprising:

means responsive to said furnace pressure signal for controlling said pressurizing means whereby the source pressure of said carrier gas is varied as a function of the furnace pressure.

17. The apparatus of claim 15 further comprising:

means responsive to said furnace pressure signal for controlling said pressurizing means whereby the source pressure of said carrier gas is varied as a function of the furnace pressure.

18. The apparatus of claim 14 further comprising:

means for sensing the pressure in said conduit means upstream of said means for feeding the pulverized material;

means for sensing the temperature in said conduit means upstream of said means for feeding the pulverized material;

means for sensing the volume flow rate of the carrier gas in said conduit means upstream of said means for feeding the pulverized material; and means responsive to said signals commensurate with sensed upstream pressure and temperature for varying said valve means control signal whereby said control signal is compensated for temperature and pressure variations in said conduit means.

19. The apparatus of claim 17 further comprising:

means for sensing the pressure in said conduit means upstream of said means for feeding the pulverized material;

means for sensing the temperature in said conduit means upstream of said means for feeding the pulverized material;

means for sensing the volume flow rate of the carrier gas in said conduit means upstream of said means for feeding the pulverized material; and means responsive to said signals commensurate with sensed upstream pressure and temperature for varying said valve means control signal whereby said control signal is compensated for temperature and pressure variations in said conduit means.

20. The apparatus of claim 14 wherein said means for coupling said conduit means to the interior of the furnace comprises:
means controllably dividing said fuel stream into two portions; and
means for injecting each of said fuel stream portions into a tuyere associated with the furnace.

21. The apparatus of claim 20 wherein said means for controllably dividing said fuel stream comprises:
means for sensing the pressure drop in each of said injecting means;
means for comparing said sensed pressure drops and generating a signal commensurate with the difference therebetween;
means responsive to said pressure drop difference signal for adjusting said dividing means.

22. The apparatus of claim 14 further comprising:
means interposed in said conduit means upstream of said valve means for controlling the temperature of said pressurized carrier gas.

23. The apparatus of claim 22 wherein said carrier gas temperature controlling means comprises:
cooler means;
controllable valve means connected in series with said cooler means; and
bypass conduit means connected in parallel with said series connected valve means and cooler means whereby a controllable portion of said carrier means may be cooled and thereafter mixed with the remaining portion of said carrier gas.

24. The apparatus of claim 19 further comprising:
means interposed in said conduit means upstream of said valve means for controlling the temperature of said pressurized carrier gas.

25. The apparatus of claim 24 wherein said carrier gas temperature controlling means comprises:
cooler means;
controllable valve means connected in series with said cooler means; and
bypass conduit means connected in parallel with said series connected valve means and cooler means whereby a controllable portion of said carrier means may be cooled and thereafter mixed with the remaining portion of said carrier gas.

26. The apparatus of claim 25 further comprising:
means for delivering said signal commensurate with sensed upstream pressure to said controllable valve means whereby the carrier gas temperature may be automatically controlled.

* * * * *